Dec. 19, 1944.  W. A. PENNOW  2,365,587
LIGHTING APPARATUS
Filed Dec. 13, 1939   3 Sheets-Sheet 3

WITNESSES:
William B. Sellers.
Nw. C. Groome

INVENTOR
Willis A. Pennow.
BY
Crawford
ATTORNEY

Patented Dec. 19, 1944

2,365,587

UNITED STATES PATENT OFFICE 2,365,587

LIGHTING APPARATUS

Willis A. Pennow, Cleveland, Ohio, assignor to Westinghouse Electric & Manufacturing Company, East Pittsburgh, Pa., a corporation of Pennsylvania Application December 13, 1939, Serial No. 309,052

13 Claims. (Cl. 177—329)

My invention relates, generally, to lighting apparatus and, more particularly, to contact lights of the floating type suitable for installation at seadromes and other landing areas for aircraft adapted for water operation to identify a cleared landing area or channel, the direction of flight path, to indicate the surface level of the area, etc.

Heretofore, attempts have been made to devise a suitable contact light for installation in this manner. Early attempts were directed toward the use of incandescent lamps mounted on posts or anchored floats of more or less solid construction and operated on commercial power by means of underwater cable systems. Such systems produced sufficient light output but constituted a hazard to small boats and aircraft especially in rough weather. The use of floats with cable connections to shore resulted in considerable cable trouble and were not satisfactory.

Various attempts were then made to utilize dry and lead storage batteries mounted on the floats but this was not successful for the reason that the batteries were so greatly overloaded by the incandescent lamps used that their life was comparatively short resulting in high maintenance expense and unreliable service. Such deficiencies could not be overcome by the use of switches whereby the lights were turned on and off as needed by an attendant in a boat as considerable time was required for this operation and it was both difficult and dangerous to carry out during rough weather. Due to the time required to turn all the lights on and off the problem of excessive battery drain was not solved.

Various attempts were also made to increase battery life by utilizing flasher mechanisms to produce a flashing light but it was found that relatively large lamps on the order of 15 candlepower were required which still resulted in excessive battery drain and did not provide sufficient daytime visibility.

Another disadvantage of these devices was that the lighting unit was not removably attached to the float which made it necessary to remove the complete assembly from the water to service any part of it.

None of these devices were satisfactory from the standpoint of safety to aircraft and small boats and were difficult and expensive to service and maintain in proper operating condition at all times and under all kinds of weather conditions. They were also not satisfactory for the further reason that they did not provide a relatively steady or fixed source of light in rough weather and did not have the desired and necessary degree of visibility.

The object of my invention, generally stated, is to provide a contact light for installation on water which shall be of simple, rugged and reliable construction and which may be economically manufactured and maintained in satisfactory operating condition.

A more specific object of my invention is to provide a contact light which has a high degree of visibility under all weather conditions and which produces a relatively steady source of light in rough weather.

A still more specific object of my invention is to provide a contact light having relatively uniform visibility over a wide vertical angle which produces a steady appearing light when floating on rough water.

Another object of my invention is to provide a contact light so constructed that it may be readily serviced and maintained through the use of a self-contained lighting unit mounted on a float or buoy and readily detachable therefrom.

A further object of my invention is to provide for utilizing a light source on contact lights of this character which is of low wattage and high lumen output and which produces the desired degree of visibility.

A still further object of my invention is to provide for operating a gaseous discharge lamp in a self-contained lighting unit over relatively long periods of time from a battery.

Another object of the invention is to provide a self-contained lighting unit suitable for floating contact lights and other uses utilizing a gaseous discharge lamp as the light source and a battery for energizing the lamp.

Another object of the invention is to provide for operating a gaseous discharge lamp requiring a relatively high voltage from a low voltage battery.

Still another object of the invention is to provide a seadrome contact light comprising a self-contained light unit mounted on a float or buoy constructed of resilient and yieldable material.

These and other objects of my invention will become more apparent from the following detailed description when read in conjunction with the drawings in which.

In practicing my invention in its preferred form, the contact light may comprise a buoy or float of the pneumatic type constructed of rubber in the general shape or form of a doughnut with a self-contained light unit mounted thereon. The light unit preferably comprises a container in which the battery is mounted, a housing or hood for the container in which are mounted a transformer, an interrupter or inverter device and other necessary accessories and a light source in the form of a gaseous discharge lamp mounted on a length of tubing or pipe attached to the top of the hood in an upright position and enclosed by a suitable globe, either of the plain or light-directing type. The unit is so constructed that it is completely enclosed and water-tight and is of such weight and size that it may be easily handled. The unit is mounted on the float or buoy by a cage attached to the inner walls of the float so that the cage supports the unit with the bottom of the battery container below the float and the lamp above the water surface. The light unit merely rests in its supporting cage and is releasably secured therein by means of a latch at the top of the cage so that it may be readily removed therefrom while the float is anchored. The float is anchored by means of a cable or chain attached to the bottom of the cage. The light unit of my invention comprises a gaseous discharge lamp designed to operate on alternating current at relatively high voltage from a low voltage battery or other primary source. The lamp is connected to the battery through a high-ratio transformer and an inverter or interrupter device of the vibrator type which is operated from the battery to produce the alternating current. This unit is particularly adapted for use on floats or buoys but may be also used to advantage for other marker applications on land or water where a self-contained high efficiency light unit having relatively low light output is desired.

Figure 1:
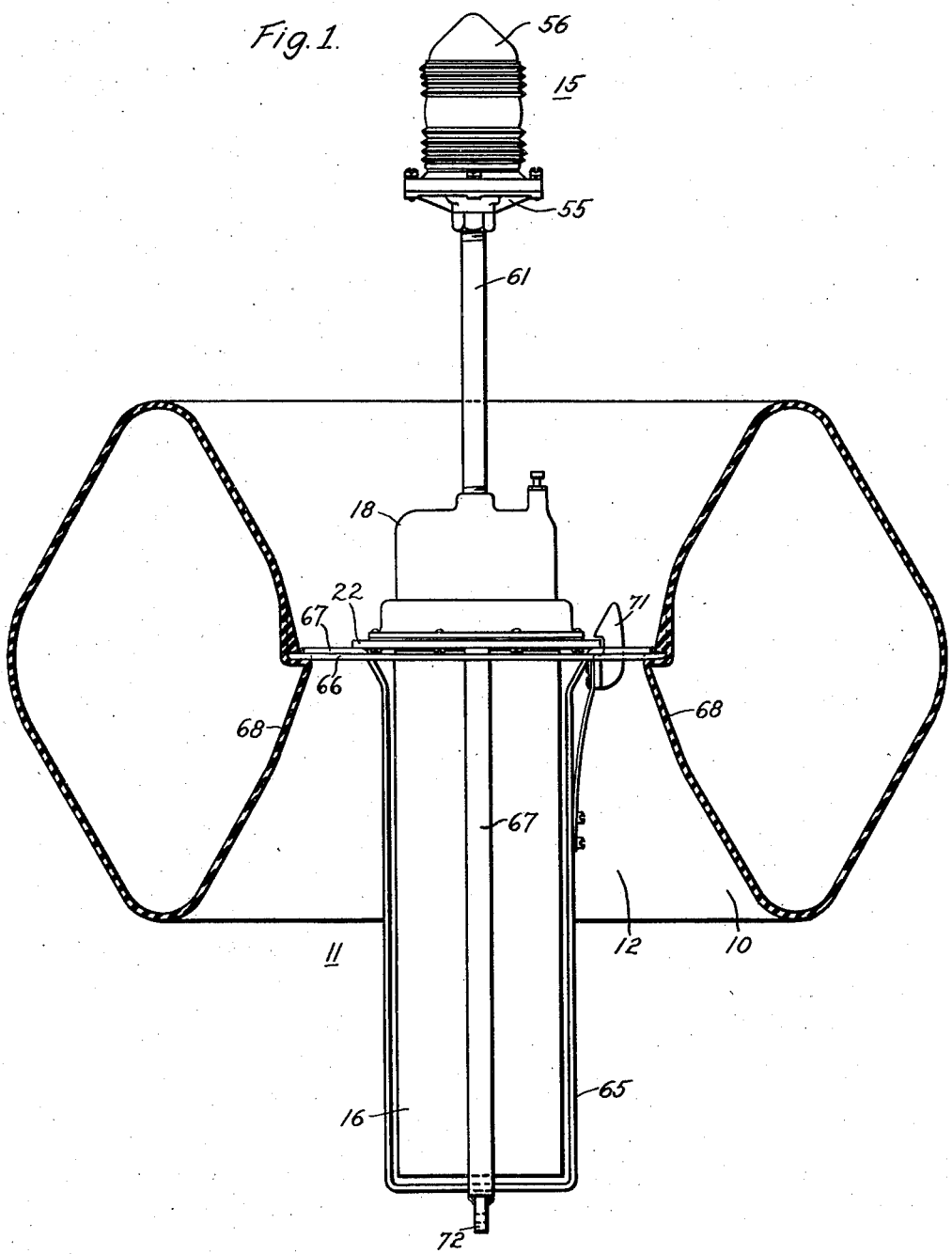
Figure 1 is a view of the contact light showing the lighting unit in elevation and the float or buoy in section.

Referring to Fig. 1 of the drawings which illustrates a preferred embodiment of the invention, it will be observed that the contact light shown comprises, generally, a float or buoy 10 and a light unit 11 mounted thereon. The float 10 is preferably of the pneumatic type constructed of a resilient or yieldable material as rubber and having the general shape of a doughnut with a central opening 12 to receive the light unit 11, as shown. In this instance the word "doughnut" is being used in a general sense for want of a better word to describe the general nature of the float, but it is to be understood that the float may be of any other suitable shape. The manner in which the light unit 11 is supported from the inside walls of the float will be described more in detail hereinafter in connection with the description of the light unit itself. A further detailed description of the construction of the float is believed to be unnecessary as the exact details of its construction are not a part of the present invention, which is directed to the light unit per se and the general combination of a float of this general character and a light unit.

Figure 2:
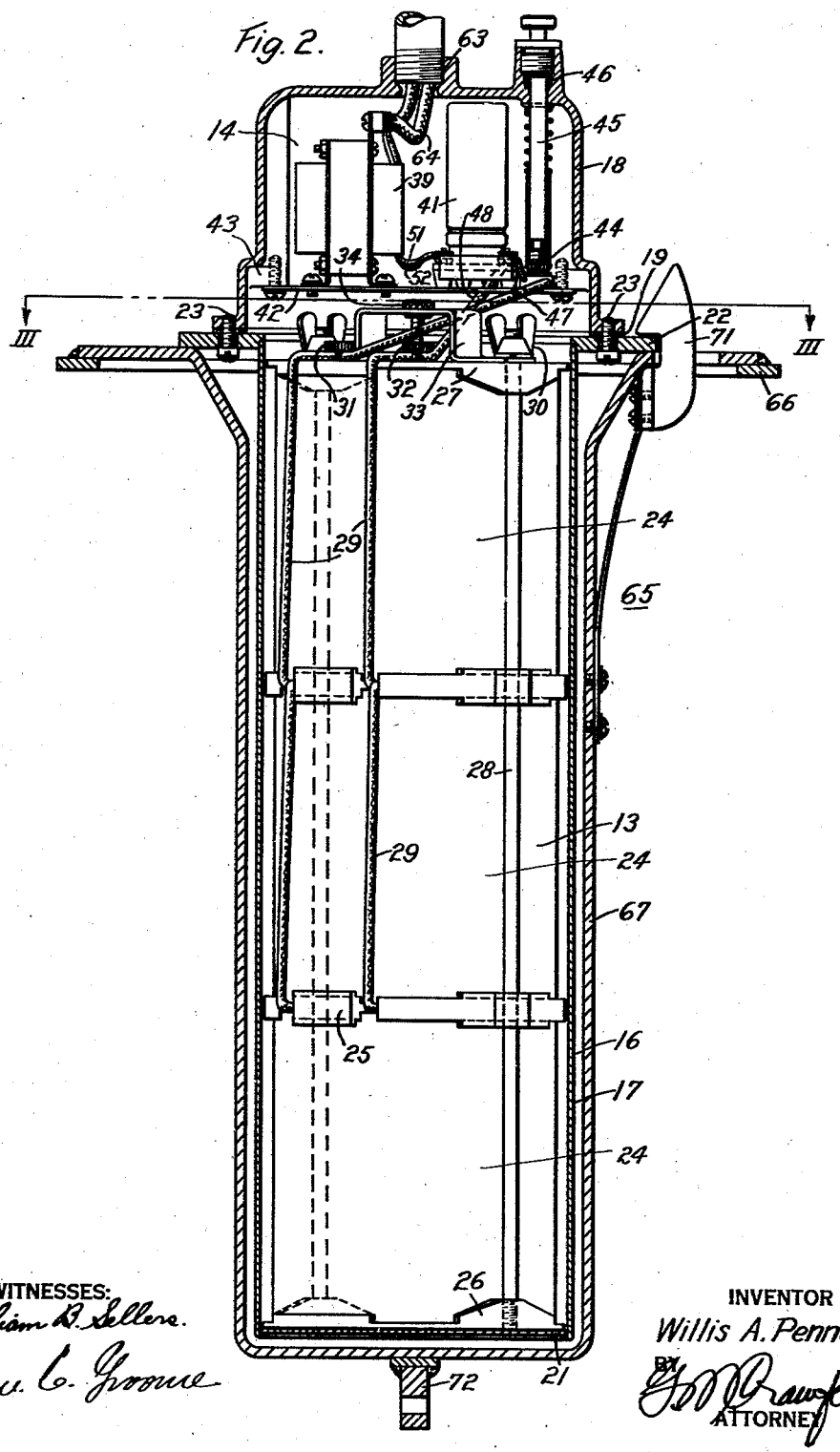
Fig. 2 is a view of the lower part of the lighting unit and support cage or basket showing the structural details thereof.
Figure 3:
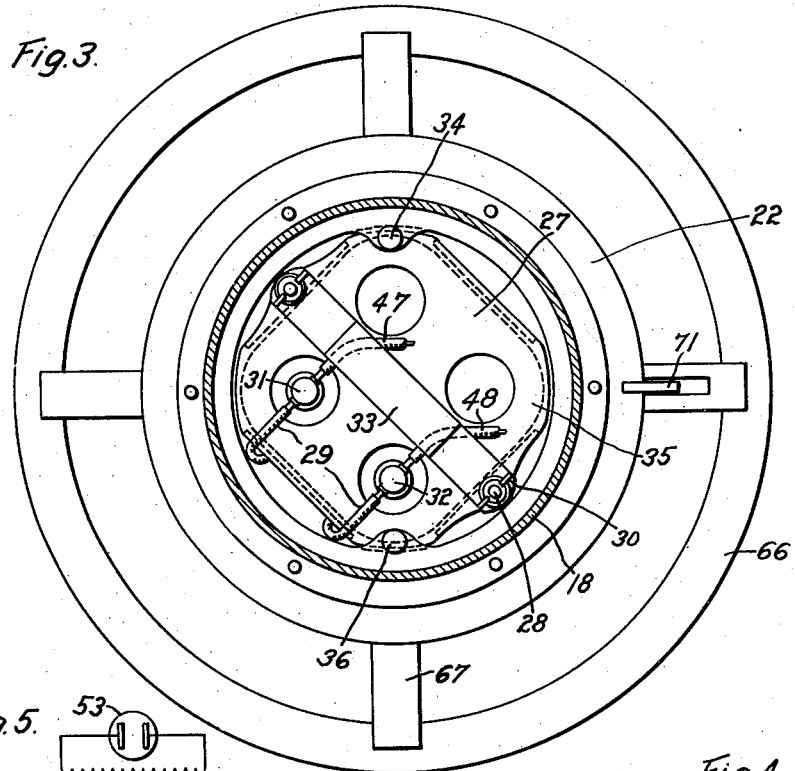
Fig. 3 is a top view of the structure of Fig. 2 taken along lines III—III showing the manner in which the battery assembly is locked within the battery container.
Figure 4:
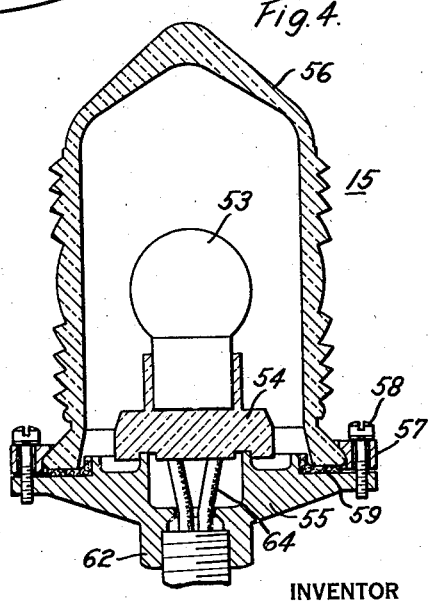
Fig. 4 is an elevational view partly in section of the lamp and globe assembly.

As shown in Figs. 2, 3 and 4, the light unit 11 may comprise, generally, a battery assembly 13, a power pack assembly 14 and a light source assembly 15, the battery and power pack assemblies being positioned within a main housing 16 which, in this instance, is constructed in two separate parts, one of which is a battery housing or container 17 and the other a power pack housing 18 jointed together by means of a water-tight joint 19.

The battery housing 17 is preferably constructed in the form of a cylindrical container having a bottom portion 21 on which the battery assembly rests and having an outwardly extending ring or flange portion 22 at the top to which the power pack housing 18 is attached by means of the screws 23. This flange 22 also functions to support the light unit in a manner which will be described presently.

The battery assembly 13 comprises a plurality of battery units 24 stacked on top of each other, as shown, with spacers 25 disposed therebetween and clamped together by means of a bottom plate 26 and a top plate 27, the adjustable rods 28 and strap 33 attached to the rods by the wing nuts 30 and which functions as a lifting handle. The terminals of the separate batteries are connected together by means of the connectors 29, the terminals 31 and 32 of the uppermost battery being exposed as shown for connection to the power pack assembly 14.

In order to provide for releasably holding the battery assembly within the container 16, the flange 22 on the container is provided with inwardly extending ear portions 34, as shown in Fig. 3, and the plate 27 is so shaped that the corner portions 35 may be moved underneath the ear portions by rotating the battery assembly in a clockwise direction to the position shown. The ear portions 34 are provided with threaded openings through which the thumb screws 36 extend which engage the corner portions 35 of the upper plate 27 and thereby lock the battery assembly within the container 16.

The power pack assembly comprises a transformer 39 and inverter or interrupter device 41 mounted on a plate 42 which is supported from the inwardly extending lugs 43 in the housing 18. A push switch 44 for controlling the connection of the battery to the power pack assembly is also mounted on the plate 42 and operated by means of a spring biased plunger 45 which extends out through the top of the housing 18 through a packed joint 46, as shown. The nature and position of this switch is that that it may be easily actuated to turn the light unit on and off by simply pushing the plunger. As shown, the terminals 31 and 32 of the battery assembly are connected to the switch 44 and inverter 41 through the conductors 47 and 48 and the inverter is connected to the transformer 39 by means of conductors 51 and 52.

While it is not necessary to utilize a housing of two separate parts, it is a desirable construction, since the entire battery assembly may be mounted in one part and the power pack assembly in another so that either may be removed or repaired without disturbing the other. The entire upper portion of the light unit including the power pack housing 18 and power pack assembly may be removed by simply disconnecting the parts at the joint 19.

The light source assembly 15 may comprise a gaseous discharge lamp 53 supported by a socket 54 on a fitting 55 which also supports the globe 56. The globe is preferably secured to the fitting 55 by means of a clamp ring 57 and screws 58 which clamp the globe against a gasket 59 to provide a water-tight joint.

The assembly 15 may be mounted on the housing by means of a pipe nipple 61 having its ends threaded to engage a threaded boss 62 on the fitting 55 and a threaded boss 63 on the top of the housing 18. The transformer 39 in the housing 18 is connected to the lamp 53 by means of conductors 64 extending through the pipe nipple 61, as shown.

The socket 54 of the assembly 15 is preferably of a shock proof type and so constructed that it will securely hold the lamp 53 under the most severe operating conditions.

The globe 56 may be of any suitable type either plain or light-directing. If desired, a suitable reflector may be utilized with the lamp 53 in order to direct the light in any desired direction or for the purpose of more fully utilizing the complete output of the lamp.

In view of the foregoing description, it will be apparent that the light unit is a self-contained device comprising a light source in the form of a gaseous discharge lamp which operate on alternating current at relatively high voltage, a low voltage battery and a power pack assembly interposed therebetween for transforming the direct current of the battery into alternating current at a sufficiently high voltage to operate the lamp. All of these parts are totally enclosed in a watertight casing in order that the unit may be mounted upon the float in a fully exposed position. The nature of the electrical system of the unit will be described hereinafter in connection with Fig. 5.

The light unit may be mounted on or supported by the float 10 in any suitable manner. However, it is desirable to provide a mounting which not only securely retains the unit in position under all operating conditions but which is also constructed so that the unit may be readily attached to and removed from the float with a minimum amount of effort and with a minimum chance of being lost while performing this operation.

In this embodiment of the invention, the unit is mounted in a basket or cage assembly 65 which comprises a flat ring member 66 to which are welded or otherwise secured the ends of a plurality of U-shaped members 67. In this instance, four of these members are utilized as shown in Fig. 3.

The ring 66 is of such diameter that it may be attached to the inside walls 68 of the buoy, as shown in Fig. 1. The particular manner in which the basket 65 is attached to the pneumatic buoy is not a part of the present invention.

The light unit may be retained within the basket 65 by means of the spring-biased latch 71 mounted upon the flange of the basket as shown in Fig. 2. The shape of the latch is such that the battery housing of the unit may be inserted into the basket and the latch 71 caused to engage the flange portion 22 on the battery housing by simply permitting the unit to drop into position. The position of the flange likewise makes it readily operable in order to release the unit from the basket.

In this instance, the float 10 is anchored by utilizing the basket 65 as an attachment for the anchor chain. For this purpose a connector ring 72 is provided on the bottom of the basket, as shown. This type of anchoring is such as to steady the movements of the float, especially during rough weather, and prevents the anchor chain from becoming tangled or fouled.

Figure 5:
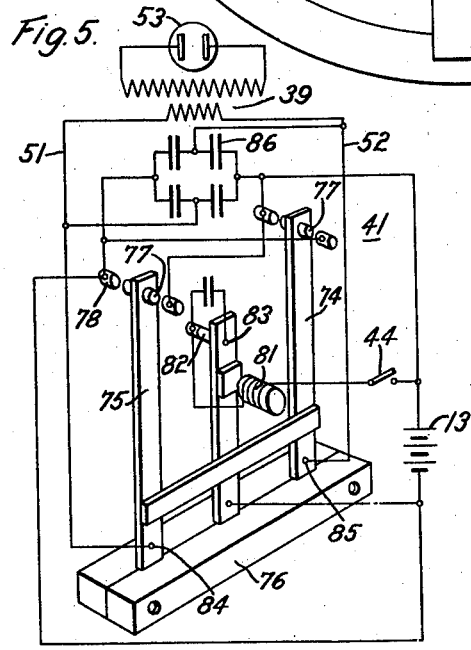
Fig. 5 is a diagrammatic view of the electrical circuit of the contact light.

The preferred electrical circuit and control apparatus is shown in Fig. 5. Since the gaseous discharge lamp 53 which is used, whether it is a straight gaseous discharge type such as neon, argon, mercury, etc., or of the fluorescent type, operates on alternating current of a higher voltage than the battery voltage, it is necessary to utilize some means between the lamp 53 and battery 13 to produce alternating current of high voltage. In this instance, the transformer 39 is of the high-ratio type having its secondary winding connected to the lamp terminals as shown, and its primary winding to the inverter 41 through conductors 51 and 52.

The inverter 41, which is shown diagrammatically, is of the vibrator type and functions as a double-throw double-pole reversing switch. The vibrating reed members 74 and 75 are mounted on a support 76 and carry the moving contacts 77 which are alternately actuated into engagement with the stationary contacts 78, which in practice, are mounted on suitable supports capable of adjustment, by means of the drive coil or magnet 81. The coil 81 is connected across the battery 13 through the normally closed drive contacts 82 and switch 44. When the switch 44 is closed, the coil is energized and attracts the armature 83 which causes the coil circuit to be interrupted and starts the reeds 74 and 75 to vibrating, thus alternately closing and breaking the coil circuit. The stationary contacts 78 are so connected to the battery 13 that an alternating current is produced at the terminals 84 and 85 of the inverter 41. In this instance, the voltage thus produced at the terminals 84 and 85 is approximately double the battery voltage due to the voltage doubling action of the double-throw double-contact arrangement of the contacts of the inverter. Condensers 86 are connected across the output terminals and the stationary contacts 78 of the inverter as shown for spark suppressing purposes and for otherwise controlling the proper operation of the inverter.

While a preferred circuit has been shown and described, it is to be understood that other arrangements may be used if desired. Thus for example, a single-pole double-throw vibrator and a high-ratio transformer having a center tapped primary may be used. In this instance, the center tap would be connected to one side of the battery and the terminals of the primary to the stationary contacts of the vibrator, the other side of the battery being connected to the moving contact of the vibrator.

Any other suitable arrangement may be utilized so long as it functions to transform the low-voltage battery current into a high-voltage alternating current to operate the gaseous discharge lamp regardless of whether or not the inverter or interrupter functions as a voltage doubling device. For example, an induction coil and an interrupter may be used, this arrangement functioning to amplify the battery voltage many times in the manner of an ignition system on an internal combustion engine.

The use of a gaseous discharge lamp makes it possible to utilize a battery, either dry or wet, or any source of primary power over relatively long periods of time as compared to the effective life of a similar battery when an incandescent lamp is used. Furthermore, the gaseous discharge lamp requires a comparatively low current and operates at relatively high efficiencies per watt as compared to incandescent lamps. Due to the low current consumption of a lamp of this character, the battery continues to operate the lamp in a satisfactory manner until it is almost completely exhausted, which results in long battery life and economical operation both from the standpoint of battery cost and maintenance expense.

In addition to the foregoing advantages of the light unit employing a gaseous discharge lamp over an incandescent lamp, it may be also pointed out that the gaseous discharge lamp has a much higher light output and has very good daytime visibility whereas the daytime visibility of the incandescent lamp is almost nil.

There are also many advantages of the contact light of my invention as a whole over the lights heretofore used employing wood or metal floats with light units employing incandescent lamps and lead storage batteries. The pneumatic float or buoy has a much greater life than wood or metal floats, is completely immune from shocks due to collision and will not damage the pontoons of aircraft or hulls of small boats.

The pneumatic float operates at very low or zero pressure so that it is not seriously affected by punctures above or below the waterline and will not sink. It also has a large reserve of supporting capacity and a high degree of serviceability as the light unit may be removed and the float left anchored whereas wood or metal floats must be removed and the anchor marked.

The mechanical arrangement and design of the light unit is simple, compact and rugged and may be easily attached to and removed from the float from a boat. The assembly of the unit is such that it may be readily opened for repair and replacement of batteries when necessary. The battery assembly may be readily removed from its housing or container without disturbing the power pack assembly, which likewise may be removed without removing the battery assembly.

The use of a cage or basket attached to the inside walls of the float for supporting the light unit makes the unit accessible and easily removed from or attached to the float with minimum danger of dropping the unit during such operation. The use of the basket as an attaching means for the anchor chain provides maximum stability of the float thereby increasing the effectiveness of the light under all weather conditions.

It may be stated, in conclusion, that while the illustrated example constitutes a preferred and practical embodiment of my invention, I do not wish to limit myself strictly to the exact details herein illustrated, since modifications of the same may be made without departing from the spirit and principles of the invention, as defined in the appended claims.

I claim as my invention:

1. A floating seadrome marker light for use in outlining landing and other areas for seaplanes on water comprising, a generally doughnut-shaped float, and a separate water-tight self-contained light unit suspended within the float from the inner side wall thereof, said light unit including a light source and a battery mounted within a water-tight enclosure which supports the light source above the top of the float and the battery below the top of the float, said float having a yieldable resilient wall forming a chamber containing a gaseous medium at approximately atmospheric pressure, said float and light unit providing a structure which is non-hazardous to surface craft and seaplanes.

2. A floating marker light for use as a contact or boundary light on seadromes for outlining landing and other areas on water comprising, a generally doughnut-shaped pneumatic float constructed of rubber having relatively flexible and resilient side walls forming a chamber which contains a gaseous medium at approximately atmospheric pressure, and a separate self-contained light unit for the float comprising an elongated water-tight container suspended within the float and detachably supported from the inner walls thereof in an exposed position, a tubular member mounted on the top of the container so as to extend above the float, a lamp socket mounted at the top of the tubular member for supporting a lamp, a globe enclosing said socket, said container, tubular member and globe forming a water-tight assembly, and means including a battery mounted in the container for operating the lamp, said float and light unit providing a marker light structure which is readily submersible and displaceable upon being struck by surface craft and seaplanes without damage to itself or the surface craft and seaplanes.

3. A seadrome contact light for marking runways and other areas on water for both day and night operations of seaplanes comprising, a generally doughnut-shaped float, having yieldable resilient walls and containing a gaseous medium at approximately atmospheric pressure, a separate self-contained light unit for the float comprising a lamp and a battery contained within a water-tight enclosure, and means for readily attaching and detaching the light unit to and from the inner walls of the float with the lamp above the float, said light unit being so interrelated with the float as to provide a structure which is stable and readily submersible and displaceable upon being struck by surface craft and seaplanes without injury to itself or the hulls of the surface craft or the pontoons of the seaplanes.

4. A seadrome contact light for marking runways and other areas on water for both day and night operations of seaplanes comprising, a generally doughnut-shaped float constructed of a yieldable and resilient material so as to have flexible and yieldable side walls and containing a gaseous medium at approximately atmospheric pressure, a separate self-contained light unit for the float, said light unit embodying a lamp and a source of current for the lamp mounted in a water-tight enclosure, a basket supported within the float from the inner wall thereof for removably supporting the light unit with the lamp above the float, said basket extending downwardly below the bottom of the float, said float and said unit being so constructed as to provide a structure which is readily submersible and displaceable when struck by surface craft and seaplanes without injury to itself or the hulls of the surface craft and pontoons of the seaplanes.

5. A floating light buoy for outlining landing lanes and controlled areas on water for seaplane operation and which is so constructed as to be readily submersible and displaceable upon engagement with surface craft and seaplanes without injury to the light buoy or the parts of the surface craft and seaplanes which strike it and which at the same time functions to provide a steady appearing light source comprising, a generally doughnut-shaped buoy constructed of resilient material and having flexible resilient side walls enclosing a gaseous medium at approximately atmospheric pressure and which yield in accordance with the motion of the water to impart stability to the float, and a separate self-contained light unit attached to the inner wall of the float, said light unit comprising an elongated water-tight enclosure for supporting a gaseous discharge lamp constituting a relatively large light source above the top of the float and a battery for operating the lamp below the top of the float, said relatively large light source cooperating with the stability provided by the yieldability of said float to contribute to the appearance of light steadiness.

6. A self-contained light unit adapted for use on floats and the like comprising, a battery, a relatively deep cup-shaped container for the battery open at the top only, said container having a circumferential outwardly extending support flange at the top, an inverted cup-shaped cover for said container, means including a slender elongated rigid tubular member mounted in an upright position on the cover, a globe assembly mounted at the top of said tubular member, a socket in said globe assembly for the lamp, electrical connections extending from said socket through the tubular member to the battery, said container, cover, tubular member and globe assembly being assembled in water-tight relation to form a unitary water-tight enclosure.

7. A self-contained light unit adapted for use on floating buoys and the like for producing a relatively large light output over relatively long periods of time comprising, a gaseous discharge lamp, said lamp constituting a relatively large light source, a battery, a container for the battery, a cup-shaped cover detachably secured to the top of the container, a circuit interrupter device and a transformer mounted within said cup-shaped cover and forming a power unit removable as a unit with the cover from the container and operable to convert low-voltage direct current to high voltage alternating current for operating said lamp from the battery, and means including an elongated rigid tubular member and an enclosing globe mounted at the top thereof mounted in an upright position on the cover for supporting and enclosing the lamp, said container, cover, tubular member and globe forming a unitary water-tight enclosure openable at the joint between the cover and container, whereby the power unit and battery may be readily serviced or replaced.

8. A seadrome contact light for marking runways and other areas on water for both day and night operations of seaplanes comprising, a generally doughnut-shaped float, having yieldable resilient walls and containing a gaseous medium, a separate self-contained light unit for the float comprising a lamp and a battery contained within a water-tight enclosure, and means for readily attaching and detaching the light unit to and from the inner walls of the float with the lamp above the float and the battery below the top of the float, said light unit being so interrelated with the float as to provide a structure which is stable and readily submersible and displaceable upon being struck by surface craft and seaplanes without injury to itself or the hulls of the surface craft or the pontoons of the seaplanes.

9. A floating seadrome marker light for use in outlining landing and other areas for seaplanes on water comprising, an annular float of tubular form having yieldable resilient walls and containing a gaseous medium at a pressure such as to permit the walls of the float to be deformable by the forces exerted thereon by the wave action of the water, a separate self-contained light unit mounted within the opening in the float, said light unit including a lamp and a battery and a water-tight enclosure for said lamp and battery for supporting the lamp above the top of the float and the battery below the top of the float, and means for securing the light unit to the float, said float and light unit being so combined as to provide a structure which possesses a relatively high degree of stability regardless of the roughness of the water and which is readily submersible and displaceable when struck by surface craft and the pontoons of seaplanes without damage to itself or the surface craft and pontoons.

10. A seadrome contact light for use in marking runways and other areas on water for seaplane operations without creating a hazard to surface craft and seaplanes by being struck thereby comprising, a generally doughnut-shaped tubular float, and a separate self-contained water-tight light unit including a lamp and means including a battery for operating the lamp mounted on the float, said light unit including a water-tight enclosure disposed within the opening of the float for supporting the lamp above the top of the float and the battery below the top of the float, said float containing air and having yieldable resilient walls which are deformable by the forces exerted thereon by the movement of the water and said light unit being so arranged with respect to the float as to provide a structure which is stable when floating upon the water and which is easily submersible and displaceable upon engagement with surface craft and the pontoons of seaplanes without damage to itself or to the hulls of the surface craft and the pontoons of the seaplanes.

11. A floating seadrome marker light for positioning in a body of water to aid seaplanes in landing on or taking off from same, said marker light comprising an annular pneumatic rubber tube having yieldable resilient walls and containing a gaseous medium, an annular metal ring mounted substantially horizontally within said tube intermediate the top and bottom thereof to be supported by said tube, a water-tight case, battery means received in said case, strap means supporting said case and engaging with and being supported by said metal ring, a light source, support means mounted upon said case for positioning the light source above the top of the tube, and circuit means connecting said battery means to said light source, said water-tight case and said support means constituting a unitary water-tight enclosure for the battery means, light source and circuit means.

12. A seadrome contact light for marking runways and other areas on water for both day and night operations of seaplanes comprising, an annular float of tubular form having yieldable resilient walls and containing a gaseous medium at a pressure such as to permit the walls of the float to be distorted by the forces exerted thereon by the movement of the water, a separate self-contained light unit mounted within the opening in the float, said light unit including a water-tight container, battery means mounted within the container, a light source and supporting means including an enclosing globe for the light source mounted upon the top of the container for supporting the light source appreciably above the top of the float, a basket mounted within the opening in the float and secured to the walls thereof for detachably supporting the light unit, and means for detachably securing the light unit in the supporting basket, whereby said light unit may be readily attached to and detached from the float without removing said float from the water.

13. A light buoy for marking runways and other areas on water comprising, an annular float having yieldable resilient walls and containing a gaseous medium at a pressure to permit the walls of the float to yield to the forces exerted by the movement of the water, a self-contained light unit positioned within the opening of the float, said light unit comprising a water-tight casing housing a battery, a light source and water-tight support means mounted upon the top of the water-tight casing in a vertical position for positioning the light source appreciably above the casing, and means interposed between the water-tight casing and the walls of the float rigidly supporting the self-contained light unit from the float with the light source above the top of float and the battery below the top of the float, said supporting means having openings therein between the inner walls of the float and the outer walls of the water-tight casing to permit water to pass therebetween.

WILLIS A. PENNOW.